(12) United States Patent  (10) Patent No.: US 12,452,482 B2
Zhang  (45) Date of Patent: Oct. 21, 2025

(54) INFORMATION DISPLAY METHOD, ELECTRONIC DEVICE, AND STORAGE MEDIUM

(71) Applicant: Beijing Zitiao Network Technology Co., Ltd., Beijing (CN)

(72) Inventor: Kai Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/748,577

(22) Filed: Jun. 20, 2024

(65) Prior Publication Data

US 2024/0348863 A1  Oct. 17, 2024

Related U.S. Application Data

(63) Continuation of application No. PCT/CN2023/075598, filed on Feb. 13, 2023.

(30) Foreign Application Priority Data

Feb. 24, 2022  (CN) .......................... 202210174154.7

(51) Int. Cl.
 H04N 21/431 (2011.01)
 G06F 16/738 (2019.01)
(52) U.S. Cl.
 CPC ....... *H04N 21/4316* (2013.01); *G06F 16/739* (2019.01)
(58) Field of Classification Search
 CPC .................. H04N 21/4316; G06F 16/739
 See application file for complete search history.

(56) References Cited

U.S. PATENT DOCUMENTS 11,178,460 B2 * 11/2021 Yang ................... G06Q 30/0257
2003/0131357 A1   7/2003 Kim
2010/0153831 A1   6/2010 Beaton
(Continued)

FOREIGN PATENT DOCUMENTS

CN   111143610 A   5/2020
CN   112770187 A   5/2021
(Continued)

OTHER PUBLICATIONS

China National Intellectual Property Administration, Office Action and Search Report Issued in Application No. 202210174154.7, Mar. 16, 2023, 15 pages.

(Continued)

*Primary Examiner* — Chenea Davis
(74) *Attorney, Agent, or Firm* — Alleman Hall & Tuttle LLP

(57) ABSTRACT

An information display method, an information display apparatus, an electronic device, and a storage medium are provided by embodiments of the present disclosure. The method includes: playing a first video in a video playing page; and displaying, in response to an information display operation acting on the video playing page, an object card of a target object in the video playing page instead of the first video, the object card including a first region and a second region, the first region being used for displaying first information of the target object, and the second region being used for displaying second information of at least one associated object contained in the target object.

20 Claims, 4 Drawing Sheets

(56) References Cited

U.S. PATENT DOCUMENTS

2013/0151339 A1\* 6/2013 Kim .................. G06Q 30/02
                                                    705/14.55
2015/0245103 A1   8/2015 Conte
2022/0217444 A1\* 7/2022 Crossley ............. G06F 9/451

FOREIGN PATENT DOCUMENTS

| CN | 112783591 A | 5/2021 |
| CN | 113395568 A | 9/2021 |
| CN | 113542853 A | 10/2021 |
| CN | 113760158 A | 12/2021 |
| CN | 113792181 A | 12/2021 |
| CN | 114546565 A | 5/2022 |
| EP | 3926967 A1 | 12/2021 |

OTHER PUBLICATIONS

ISA China National Intellectual Property Administration, International Search Report Issued in Application No. PCT/CN2023/075598, Apr. 7, 2023, WIPO, 11 pages.

European Patent Office, Extended European Search Report for European Application No. 23759041.9, mailed Jan. 15, 2025, 9 pages.

\* cited by examiner

INFORMATION DISPLAY METHOD, ELECTRONIC DEVICE, AND STORAGE MEDIUM

CROSS-REFERENCE TO RELATED APPLICATIONS

This application is a continuation of International Patent Application No. PCT/CN2023/075598, filed on Feb. 13, 2023, which claims the priority to and benefits of the Chinese Patent Application No. 202210174154.7, which was filed on Feb. 24, 2022. All the aforementioned patent applications are hereby incorporated by reference in their entireties.

TECHNICAL FIELD

Embodiments of the present disclosure relate to a field of computer technology, for example, relate to an information display method, an information display apparatus, an electronic device, a storage medium, and a program product.

BACKGROUND

At present, users can watch videos in a video playing page. However, in the related technology, the content displayed in the video playing page is relatively simple, which cannot meet the needs of users.

SUMMARY

The embodiments of the present disclosure provide an information display method, an information display apparatus, an electronic device, a storage medium, and a program product.

In a first aspect, the embodiments of the present disclosure provide an information display method, and the method includes:

playing a first video in a video playing page; and switching, in response to an information display operation acting on the video playing page, the first video to display of an object card of a target object, wherein the object card comprises a first region and a second region, the first region is used for displaying first information of the target object, and the second region is used for displaying second information of at least one associated object contained in the target object.

In a second aspect, the embodiments of the present disclosure further provide an information display apparatus, and the apparatus includes:

a first playing module, configured to play a first video in a video playing page; and an information display module, configured to switch, in response to an information display operation acting on the video playing page, the first video to display of an object card of a target object, wherein the object card comprises a first region and a second region, the first region is used for displaying first information of the target object, and the second region is used for displaying second information of at least one associated object contained in the target object.

In a third aspect, the embodiments of the present disclosure further provide an electronic device, and the electronic device includes:

one or more processors; and a storage apparatus, configured to store one or more programs, wherein the one or more programs, when executed by the one or more processors, cause the one or more processors to implement the information display method according to the embodiments of the present disclosure.

In a fourth aspect, the embodiments of the present disclosure further provide a computer-readable storage medium, a computer program is stored on the computer-readable storage medium, and the computer program, when executed by a processor, causes the processor to implement the information display method according to the embodiments of the present disclosure.

In a fifth aspect, the embodiments of the present disclosure further provide a computer program product, and the computer program product, when executed by a computer, causes the computer to implement the information display method according to the embodiments of the present disclosure.

BRIEF DESCRIPTION OF DRAWINGS

Throughout the accompanying drawings, identical or similar reference signs represent identical or similar elements. It should be understood that, the accompanying drawings are schematic, and components and elements may not be necessarily drawn to scale.

DETAILED DESCRIPTION

Figure 1:
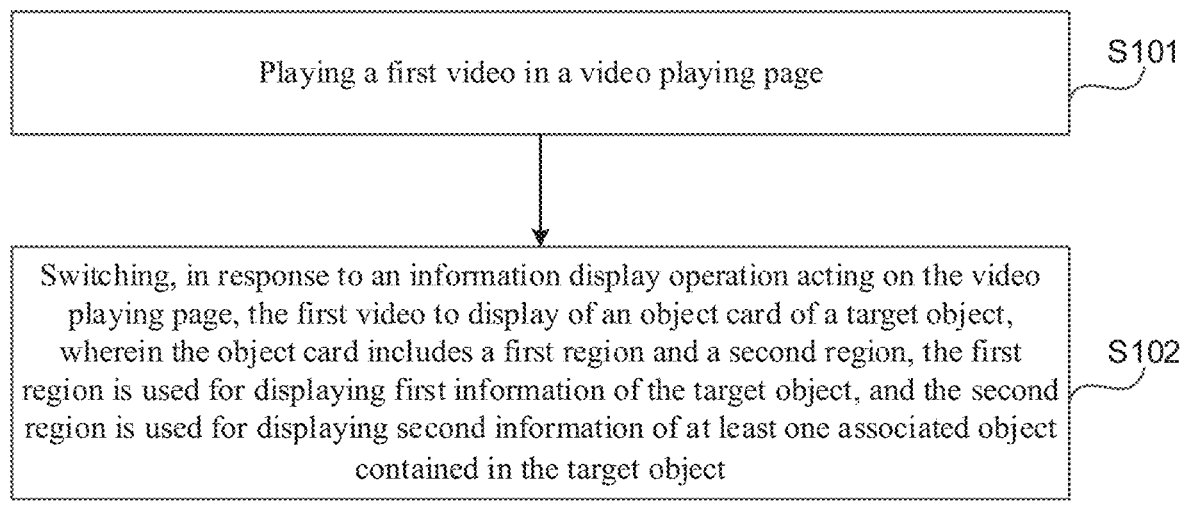
FIG. 1 is a flowchart of an information display method provided by an embodiment of the present disclosure.

The embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method implementations of the present disclosure may be performed according to different orders and/or in parallel. Furthermore, the method implementations may include additional steps and/or omit performing the illustrated steps. The scope of the present disclosure is not limited in this aspect.

As used herein, the terms "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit the interdependence relationship or the order of functions performed by these devices, modules or units.

It should be noted that the modifications of "a," "an," "a plurality of," and the like mentioned in the present disclosure are illustrative rather than restrictive, and those skilled in the art should understand that unless the context clearly indicates otherwise, these modifications should be understood as "one or more."

The names of messages or information exchanged between multiple devices in the implementations of the present disclosure are only for illustrative purposes, and are not intended to limit the scope of these messages or information.

FIG. 1 is a flowchart of an information display method provided by an embodiment of the present disclosure. The method can be executed by an information display apparatus, and the apparatus can be realized by software and/or hardware and can be configured in an electronic device, typically, configured in a mobile phone or a tablet computer. The information display method provided by the embodiments of the present disclosure can display the object card in the video playing page. As shown in FIG. 1, the information display method provided by this embodiment may include:

S101: playing a first video in a video playing page.

For example, the electronic device can display a video playing page based on a corresponding trigger operation of a user, and play videos (including a first video) in the video playing page. Here the video playing page may be a page for playing videos, such as a recommended video playing page for playing recommended videos. The first video may be a video played in the video playing page, such as a video played in the video playing page when an information display operation is received.

S102: switching, in response to an information display operation acting on the video playing page, the first video to display of an object card of a target object, wherein the object card includes a first region and a second region, the first region is used for displaying first information of the target object, and the second region is used for displaying second information of at least one associated object contained in the target object.

Here the information display operation can be understood as an operation for displaying information of the target object, such as an operation for displaying an object card of the target object. For example, the information display operation may be a video switching operation, such as a vertical sliding operation acting on the video playing page. The target object may be an object recommended to the user, such as a city or place (e.g., a shopping mall, a shop, etc.) recommended to the user. The first information of the target object may include identification information (such as the name of the target object) and/or introduction information of the target object.

Figure 2:
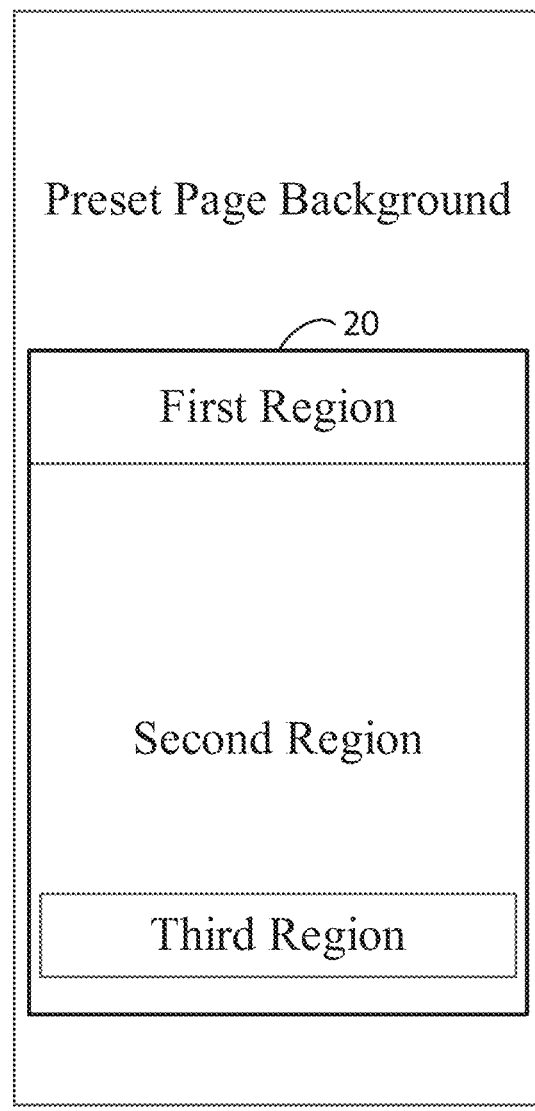
FIG. 2 is a schematic diagram of an object card provided by an embodiment of the present disclosure.

The object card 20 of the target object may be a card for displaying the first information of the target object and the second information of the associated object of the target object, which can be added to the video stream of the video playing page when the preset condition is met, so as to be displayed when the electronic device switches to the object card 20 based on the video stream of the video playing page. This preset condition may be a preset recommendation condition for recommending the target object to the user, which may be set as required, and this embodiment is not limited in this aspect. As shown in FIG. 2, the object card 20 of the target object may contain a first region for displaying the first information of the target object and a second region for displaying the second information of the associated object of the target object, and may further be provided with a third region for displaying the control.

The associated object of the target object may be a sub-object (such as a resource) with high recommendation priority which is contained in the target object. When the target object is a city, the associated object can be, for example, the scenic spot or shopping mall in the city. When the target object is a shopping mall, the associated object can be, for example, a store included in the shopping mall. When the target object is a store, the associated object can be, for example, a commodity in the store. Here, the shopping mall/store may be an offline physical shopping mall/store or an online virtual shopping mall/store, and this embodiment is not limited in this aspect. The second information of the associated object may include information such as the name, picture and/or introduction of the associated object. The second region in the object card can display the object information of some associated objects of the target object.

For example, as shown in FIG. 2, when the user wants to view the object card of the target object, the user can perform an information display operation in the video playing page. Accordingly, when the electronic device detects the information display operation of the user, the first video currently played may be switched to display of the object card 20 of the target object, the first information of the target object is displayed in the first region of the object card 20, and the second information of at least one associated object of the target object is displayed in the second region of the object card.

Taking the information display operation as a video switching operation as an example, when the current condition meets the preset condition for recommending the target object, the object card of the target object can be added to the video stream of the video playing page. Therefore, when the user wants to switch the video, the user can perform the video switching operation in the video playing page. Accordingly, the electronic device can perform video switching according to the video stream when receiving the video switching operation, and take the video switching operation as an information display operation when it needs to switch to the display of the object card of the target object contained in the video stream. In response to the information display operation, the first video is switched to the object card of the target object for display.

In this embodiment, the related information of the target object and its associated object recommended to the user is displayed in the video playing page in the form of an object card, so that the user can quickly understand the target object and the resource provided by the target object through the object card without switching to other pages or other application software, which can enrich the content displayed in the video playing page and the presentation form of the content in the video playing page, and also improve the information viewing efficiency of the user, thereby improving the user experience.

In an embodiment, after switching the first video to the display of the object card of the target object, the method further includes: displaying a first feedback control of the target object in response to a first feedback operation for the target object, wherein the first feedback control is used for triggering feedback on the target object; and/or displaying a second feedback control of a second associated object among the at least one associated object in response to a second feedback operation for the second associated object, wherein the second feedback control is used for triggering feedback on the second associated object.

Here the first feedback operation may be an operation for displaying a feedback control of the target object to perform feedback on the target object, such as a long press operation for the target object (such as a long press operation acting on the first region) or a long press operation for the video playing page (such as a long press operation acting on the video playing page). The second feedback operation may be an operation for displaying a feedback control of a certain associated object to perform feedback on the associated object, such as a long press operation for the associated object. The second associated object may be an associated object to which the second feedback operation is applied. The first feedback control may be a feedback control corresponding to the target object, and the second feedback control may be a feedback control corresponding to the second associated object. The first feedback control and the second feedback control may include a feedback control for disinterested feedback and/or a feedback control for complaint. It can further include feedback controls for feedback such as the "like," "favorite," etc.

In the above implementation, the user can instruct the electronic device to display the feedback control of the target object/associated object in the video playing page by performing the corresponding feedback operation, so as to perform feedback on the target object/associated object.

For example, when the user wants to give feedback to the target object, the user can perform the first feedback operation. When the electronic device receives the first feedback operation from the user, it can display at least one feedback control of the target object, for example, display a feedback panel of the target object in the video playing page, and display the feedback control of the target object in the feedback panel. Alternatively, the feedback control of the target object is displayed in the third region of the target object card. Thus, the user can trigger the corresponding feedback control of the target object to perform feedback on the target object. Accordingly, when the electronic device detects that the user triggers a certain feedback control of the target object, it can generate and send feedback information corresponding to the feedback control to the server, and can also cancel the display of the feedback control of the target object.

When the user wants to give feedback to an associated object of the target object, the user can perform the second feedback operation. When receiving the second feedback operation from the user, the electronic device can take the associated object acted by the second feedback operation as a second associated object, and display at least one feedback control of the second associated object, for example, display a feedback panel of the second associated object in the video playing page, and display the feedback control of the second associated object in the feedback panel. Alternatively, the feedback control of the second associated object is displayed in the third region of the target object card. Thus, the user can trigger the corresponding feedback control of the second associated object to give feedback to the second associated object. Accordingly, when the electronic device detects that the user triggers a certain feedback control of the second associated object, it can generate and send feedback information corresponding to the feedback control to the server, and can also cancel the display of the feedback control of the second associated object.

In an implementation, the object card further includes a third region for displaying an interactive control, and the interactive control includes an object list control. The method further includes: displaying an associated object list of the target object in response to a trigger operation for the object list control.

Here the third region may be a region for displaying the interactive control in the object card of the target object, and controls such as the object list control can be displayed in the third region. The third region can be located in or outside the first region/second region. The object list control may be a control for instructing the electronic device to display an associated object list of the target object. The associated object list of the target object can be used to show the related information (such as the second information) of all associated objects of the target object.

For example, when the electronic device displays the object card of the target object, the object list control is displayed in the third region of the object card (as shown in FIG. 2). Thus, when the user wants to view other associated objects that are not displayed in the second region, the object list control can be triggered. Accordingly, when the electronic device detects that the user triggers the object list control, the associated object list of the target object can be displayed, for example, displaying the associated object list of the target object on an upper layer of the object card, switching the object card of the target object to display of the associated object list of the target object, or switching the current page from the video playing page to an associated object page and displaying the associated object list of the target object in the associated object page.

In the information display method provided by this embodiment, a first video is played in a video playing page; and in response to an information display operation acting on the video playing page, the first video is switched to display of an object card of a target object, wherein the object card includes a first region and a second region, the first region is used for displaying first information of the target object, and the second region is used for displaying second information of at least one associated object contained in the target object. In this embodiment, the related information of the target object and its associated object is displayed to the user in the form of an object card in the video playing page, which can enrich the content displayed in the video playing page and the display form of the content in the video playing page, so as to improve the information viewing efficiency of the user and improve the user experience.

Figure 3:
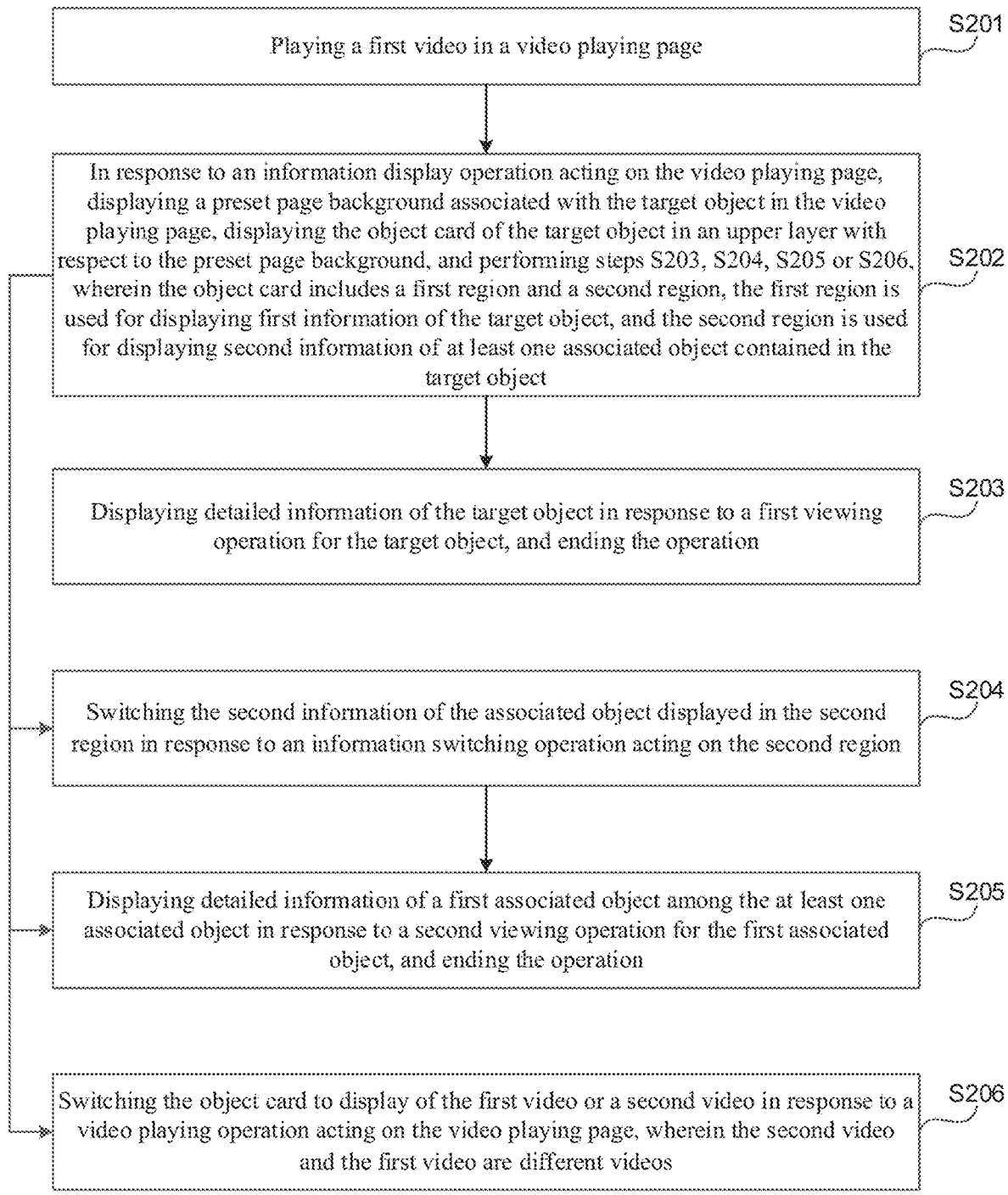
FIG. 3 is a flowchart of another information display method provided by an embodiment of the present disclosure.

FIG. 3 is a flowchart of another information display method provided by an embodiment of the present disclosure. This embodiment can be combined with one or more of the above-described embodiments. Optionally, after switching the first video to the display of the object card of the target object, the method further includes: displaying detailed information of the target object in response to a first viewing operation for the target object; and/or displaying detailed information of a first associated object among the at least one associated object in response to a second viewing operation for the first associated object.

In an embodiment, after switching the first video to the display of the object card of the target object, the method further includes: switching the second information of the associated object displayed in the second region in response to an information switching operation acting on the second region.

In an embodiment, switching the first video to the display of the object card of the target object includes: displaying a preset page background associated with the target object in the video playing page, and displaying the object card of the target object in an upper layer with respect to the preset page background.

In an embodiment, after switching the first video to the display of the object card of the target object, the method further includes: switching the object card to display of the first video or a second video in response to a video playing operation acting on the video playing page, wherein the second video and the first video are different videos.

Accordingly, as shown in FIG. 3, the information display method provided by this embodiment may include:

S201: playing a first video in a video playing page.

S202: in response to an information display operation acting on the video playing page, displaying a preset page background associated with the target object in the video playing page, displaying the object card of the target object in an upper layer with respect to the preset page background, and performing steps S203, S204, S205 or S206, wherein the object card includes a first region and a second region, the first region is used for displaying first information of the target object, and the second region is used for displaying second information of at least one associated object contained in the target object.

Here the preset page background may be a page background displayed on the lower layer of the object card in the video playing page when the object card of the target object is displayed, which can be a picture (such as a static picture or a dynamic picture), an animation or a video associated with the target object. For example, the distribution information around or inside the target object can be displayed in the preset page background. Taking the preset page background being a picture as an example, when the target object is a city, the preset page background may be a distribution map of landmark buildings such as scenic spots and/or shopping malls in the city; when the target object is a shopping mall, the preset page background may be a distribution map of shops in the shopping mall, for example, a shopping guide map, or may also be a distribution map of the shopping mall and its surrounding places; and when the target object is a store, the preset page background may be a shopping guide map of the store, so that the user can know the distribution information of the target object conveniently.

For example, as shown in FIG. 2, when the electronic device receives the information display operation of the user, the electronic device can stop playing the first video, display the preset page background (e.g., the preset page background corresponding to the object card of the target object) associated with the target object in the video playing page, and display the object card 20 of the target object at the setting position on the upper layer with respect to the preset page background. Here, the setting position can be flexibly set as required, for example, the setting position can be set to the middle and lower side of the video playing page.

S203: displaying detailed information of the target object in response to a first viewing operation for the target object, and ending the operation.

Here the first viewing operation can be an operation to view the detailed information of the target object, such as a click operation in the first region of the object card.

For example, when the user wants to view the detailed information of the target object, the user can perform the first viewing operation for the target object, such as clicking on the first information of the target object displayed in the first region. Accordingly, when the electronic device receives the first viewing operation of the user, it can display the detailed information of the target object to the user, for example, it can display the detailed information of the target object in the video playing page, such as displaying the detailed information of the target object in the object card of the target object, or displaying the detailed information of the target object in the upper layer of the object card of the target object. Alternatively, it can also switch the current page from the video playing page to a details page of the target object, and display the detailed information of the target object in the details page.

S204: switching the second information of the associated object displayed in the second region in response to an information switching operation acting on the second region.

Here the information switching operation can be an operation of switching the second information of the associated object displayed in the second region of the object card, such as a lateral sliding operation acting on the second region.

In this embodiment, the user can switch the second information of the associated object displayed in the second region through the information switching operation to view different associated objects of the target object.

For example, when the electronic device displays the object card of the target object, it can display the second information of a preset number (such as 3 or 5) of associated objects in the second region of the object card. Therefore, when the user wants to switch the second information of the associated object displayed in the second region, the information switching operation can be performed in the second region. Accordingly, when receiving the information switching operation of the user, the electronic device can take the preset number of associated objects located behind the last associated object currently displayed and closest to the associated object as the associated object to be displayed in the order from high to low according to the recommendation priority of respective associated objects of the target object, and switch the second information of the associated object displayed in the second region to the second information of the associated object to be displayed.

S205: displaying detailed information of a first associated object among the at least one associated object in response to a second viewing operation for the first associated object, and ending the operation.

Here the second viewing operation can be an operation to view the detailed information of a certain associated object of the target object, such as a click operation on the second information of a certain associated object displayed in the second region of the object card. The first associated object may be an associated object targeted by the second viewing operation.

For example, when the user wants to view the detailed information of a certain associated object (i.e., the first associated object) of the target object, the user can perform the second viewing operation for the associated object, such as clicking on the second information of the associated object displayed in the second region. Accordingly, when the electronic device receives the second viewing operation of the user, it can display the detailed information of the associated object to the user, for example, it can display the detailed information of the associated object in the video playing page, such as displaying the detailed information of the associated object in the object card of the target object, or displaying the detailed information of the associated object in the upper layer of the object card of the target object. It can also switch the current page from the video playing page to the details page of the associated object, and display the detailed information of the associated object in the details page.

Therefore, when the associated object is a commodity, the user can view the detailed information of the commodity and complete the purchase operation of the commodity without switching to other application software for purchase, which can simplify the operation as required by the user when purchasing the commodity.

S206: switching the object card to display of the first video or a second video in response to a video playing operation acting on the video playing page, wherein the second video and the first video are different videos.

Here the video playing operation can be an operation that instructs the electronic device to continue playing the video in the video playing page, such as a vertical sliding operation in the video playing page. The first video and the second video may be videos located on both sides of the object card of the target object and adjacent to the object card of the target object in the video stream of the video playing page. For example, the first video may be a video played in the video playing page when the information display operation is received, and the second video may be another video adjacent to the target object in the video stream of the video playing page in addition to the first video.

For example, when the user wants to continue watching the video in the video playing page, the user can perform a video playing operation, such as sliding vertically in the video playing page. Accordingly, when the electronic device receives the video playing operation of the user, the the object card of the target object and the preset page background displayed in the video playing page can be switched to display of the first video or the second video, such as canceling the display of the object card of the target object and the preset page background associated with the target object, and playing the first video or the second video in the video playing page.

Taking the video playing operation being a vertical sliding operation as an example, when the video playing operation is a downward sliding operation, the first video can be played in the video playing page, and when the video playing operation is an upward sliding operation, the second video can be played in the video playing page. Alternatively, when the video playing operation is an upward sliding operation, the first video can be played in the video playing page, and when the video playing operation is a downward sliding operation, the second video can be played in the video playing page.

The information display method provided by this embodiment can switch the second information of the associated object displayed in the second region, display the detailed information of the target object/associated object, or continue to play the video in the video playing page based on the corresponding trigger operation of the user, so as to achieve the different needs of the user and improve the user experience.

Figure 4:
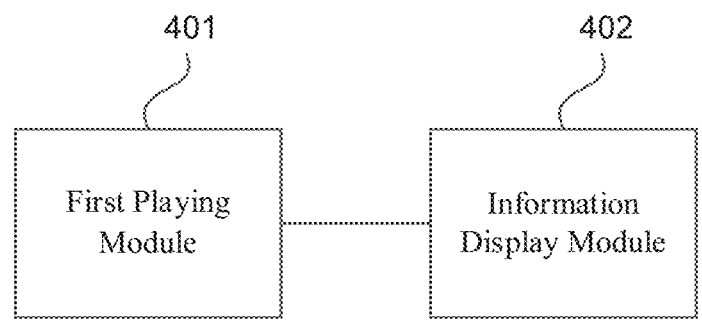
FIG. 4 is a structural block diagram of an information display apparatus provided by an embodiment of the present disclosure.

FIG. 4 is a structural block diagram of an information display apparatus provided by an embodiment of the present disclosure. The apparatus may be implemented by software and/or hardware, and may be configured in the electronic device, typically, it may be configured in a mobile phone or a tablet computer, and may achieve information display by executing the information display method. As illustrated in FIG. 4, the information display apparatus provided by this embodiment may include a first playing module 401 and an information display module 402.

The first playing module 401 is configured to play a first video in a video playing page.

The information display module 402 is configured to switch, in response to an information display operation acting on the video playing page, the first video to display of an object card of a target object, wherein the object card comprises a first region and a second region, the first region is used for displaying first information of the target object, and the second region is used for displaying second information of at least one associated object contained in the target object.

In the information display apparatus provided by this embodiment, a first video is played in a video playing page; and in response to an information display operation acting on the video playing page, the first video is switched to display of an object card of a target object, wherein the object card includes a first region and a second region, the first region is used for displaying first information of the target object, and the second region is used for displaying second information of at least one associated object contained in the target object. In this embodiment, the related information of the target object and its associated object is displayed to the user in the form of an object card in the video playing page, which can enrich the content displayed in the video playing page and the display form of the content in the video playing page, so as to improve the information viewing efficiency of the user and improve the user experience.

In an embodiment, the information display apparatus provided by this embodiment may further include: a first detailed information display module, configured to, after switching the first video to the display of the object card of the target object, display detailed information of the target object in response to a first viewing operation for the target object; and/or a second detailed information display module, configured to display detailed information of a first associated object among the at least one associated object in response to a second viewing operation for the first associated object.

In an embodiment, the information display apparatus provided by this embodiment may further include: a first feedback control display module, configured to, after switching the first video to the display of the object card of the target object, display a first feedback control of the target object in response to a first feedback operation for the target object, wherein the first feedback control is used for triggering feedback on the target object; and/or a second feedback control display module, configured to display a second feedback control of a second associated object among the at least one associated object in response to a second feedback operation for the second associated object, wherein the second feedback control is used for triggering feedback on the second associated object.

In an embodiment, the information display apparatus provided by this embodiment may further include: an information switching module, configured to, after switching the first video to the display of the object card of the target object, switch the second information of the associated object displayed in the second region in response to an information switching operation acting on the second region.

In the above-described embodiment, the information display module 402 is configured to display a preset page background associated with the target object in the video playing page, and display the object card of the target object in an upper layer with respect to the preset page background.

In the above-described embodiment, the object card further comprises a third region for displaying an interactive control, the interactive control comprises an object list control, and the information display apparatus provided by this embodiment may further include: a list display module, configured to display an associated object list of the target object in response to a trigger operation for the object list control.

In an embodiment, the information display apparatus provided by this embodiment may further include: a second playing module, configured to, after switching the first video to the display of the object card of the target object, switch the object card to display of the first video or a second video in response to a video playing operation acting on the video playing page, wherein the second video and the first video are different videos.

The information display apparatus provided by the embodiments of the present disclosure may execute the information display method provided by any embodiment of the present disclosure, and has corresponding functional modules and beneficial effects for executing the information display method. The technical details not described in detail in this embodiment can be with reference to the information display method provided by any one of the embodiments of the present disclosure.

Hereinafter, referring to FIG. 5, it shows a schematic structural diagram of an electronic device (e.g., a terminal device) 500 suitable for implementing the embodiments of the present disclosure. The terminal device in the embodiments of the present disclosure may include, but not limited to, mobile terminals, such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), etc., and fixed terminals, such as a digital television (TV), a desktop computer, etc. The electronic device shown in FIG. 5 is merely an example and should not impose any limitations on the functions and scope of use of the embodiments of the present disclosure.

Figure 5:
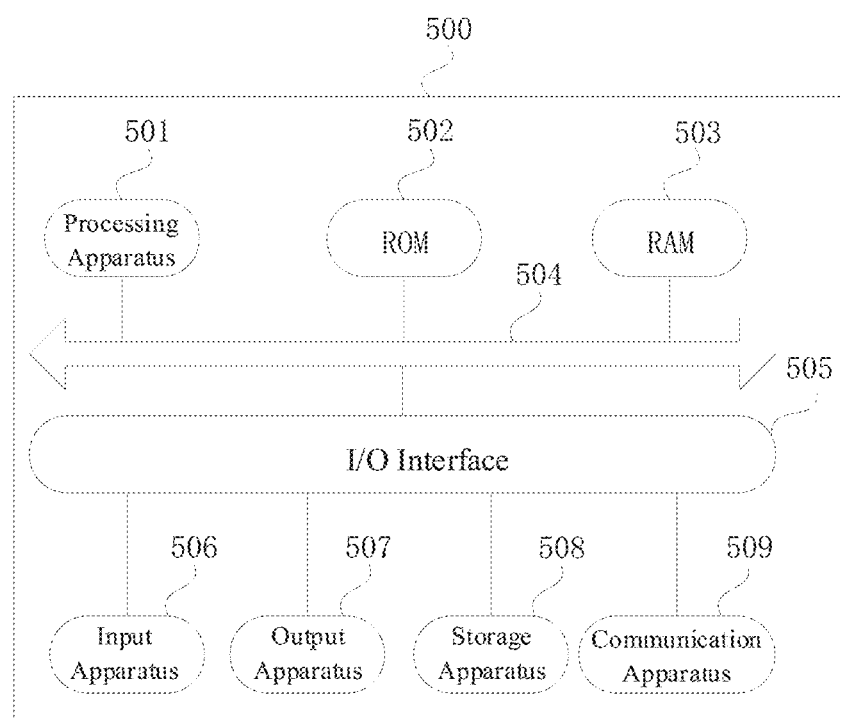
FIG. 5 is a schematic structural diagram of an electronic device provided by an embodiment of the present disclosure.

As illustrated in FIG. 5, the electronic device 500 may include a processing apparatus 501 (e.g., a central processing unit, a graphics processing unit, etc.), which may execute various appropriate actions and processing according to a program stored on a read-only memory (ROM) 502 or a program loaded from a storage apparatus 508 into a random access memory (RAM) 503. The RAM 503 further stores various programs and data required for operation of the electronic device 500. The processing apparatus 501, the ROM 502, and the RAM 503 are connected with each other through a bus 504. An input/output (I/O) interface 505 is also connected to the bus 504.

Usually, apparatuses below may be connected to the I/O interface 505: an input apparatus 506 including, for example, a touch screen, a touch pad, a keyboard, a mouse, a camera, a microphone, an accelerometer, a gyroscope, or the like; an output apparatus 507 including, for example, a liquid crystal display (LCD), a speaker, a vibrator, or the like; a storage apparatus 508 including, for example, a magnetic tape, a hard disk, or the like; and a communication apparatus 509. The communication apparatus 509 may allow the electronic device 500 to perform wireless or wired communication with other electronic devices so as to exchange data. Although FIG. 5 shows the electronic device 500 having various apparatuses, it should be understood that it is not required to implement or have all the apparatuses illustrated, and the electronic device may alternatively implement or have more or fewer apparatuses.

Specifically, according to the embodiments of the present disclosure, the process described above with reference to the flowchart may be implemented as computer software programs. For example, the embodiments of the present disclosure include a computer program product, including a computer program carried on a non-transitory computer-readable medium, and the computer program includes program codes for executing the method shown in the flowchart. In such embodiments, the computer program may be downloaded and installed from the network via the communication apparatus 509, or installed from the storage apparatus 508, or installed from the ROM 502. When executed by the processing apparatus 501, the computer program may implement the above functions defined in the method provided by the embodiments of the present disclosure.

It should be noted that the computer-readable medium described in the present disclosure may be a computer-readable signal medium or a computer-readable storage medium, or any combination thereof. The computer-readable storage medium may be, but not limited to, an electric, magnetic, optical, electromagnetic, infrared, or semiconductor system, apparatus or device, or any combination thereof. For example, the computer-readable storage medium may include, but not limited to, an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to, an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program codes contained on the computer-readable medium may be transmitted by using any suitable medium, including but not limited to, an electric wire, a fiber-optic cable, radio frequency (RF) and the like, or any appropriate combination of them.

In some implementations, the client and the server may communicate with any network protocol currently known or to be researched and developed in the future such as hypertext transfer protocol (HTTP), and may communicate (for example, via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device.

The above-mentioned computer-readable medium carries one or more programs, and the one or more programs, when executed by the electronic device, cause the electronic device to: play a first video in a video playing page; and switch, in response to an information display operation acting on the video playing page, the first video to display of an object card of a target object, wherein the object card includes a first region and a second region, the first region is used for displaying first information of the target object, and the second region is used for displaying second information of at least one associated object contained in the target object.

The storage medium may be a non-transitory storage medium.

The computer program codes for performing the operations of the present disclosure may be written in one or more programming languages or a combination thereof. The above-described programming languages include but are not limited to object-oriented programming languages, such as Java, Smalltalk, C++, and also include conventional procedural programming languages, such as the "C" programming language or similar programming languages. The program codes may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Here the name of the unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), application specific standard parts (ASSP), a system on chip (SOC), a complex programmable logical device (CPLD), etc.

In the context of the present disclosure, the machine-readable medium may be a tangible medium containing or storing a program that can be used by or in combination with an instruction execution system, apparatus or device. The machine-readable medium may be a machine-readable signal medium or a machine-readable storage medium. The machine-readable medium may include, but not limited to, an electric, magnetic, optical, electromagnetic, infrared, or semiconductor system, apparatus or device, or any appropriate combination thereof. Examples of the machine-readable storage medium may include: an electrical connection based on one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them.

According to one or more embodiments of the present disclosure, Example 1 provides an information display method, comprising:

playing a first video in a video playing page; and switching, in response to an information display operation acting on the video playing page, the first video to display of an object card of a target object, wherein the object card comprises a first region and a second region, the first region is used for displaying first information of the target object, and the second region is used for displaying second information of at least one associated object contained in the target object.

According to one or more embodiments of the present disclosure, in the method provided by Example 2 according to Example 1, after switching the first video to the display of the object card of the target object, the method further comprises:

displaying detailed information of the target object in response to a first viewing operation for the target object, and/or displaying detailed information of a first associated object among the at least one associated object in response to a second viewing operation for the first associated object.

According to one or more embodiments of the present disclosure, in the method provided by Example 3 according to Example 1, after switching the first video to the display of the object card of the target object, the method further comprises:

displaying a first feedback control of the target object in response to a first feedback operation for the target object, wherein the first feedback control is used for triggering feedback on the target object; and/or displaying a second feedback control of a second associated object among the at least one associated object in response to a second feedback operation for the second associated object, wherein the second feedback control is used for triggering feedback on the second associated object.

According to one or more embodiments of the present disclosure, in the method provided by Example 4 according to Example 1, after switching the first video to the display of the object card of the target object, the method further comprises:

switching the second information of the associated object displayed in the second region in response to an information switching operation acting on the second region.

According to one or more embodiments of the present disclosure, in the method provided by Example 5 according to any one of Examples 1-4, switching the first video to the display of the object card of the target object comprises:

displaying a preset page background associated with the target object in the video playing page, and displaying the object card of the target object in an upper layer with respect to the preset page background.

According to one or more embodiments of the present disclosure, in the method provided by Example 6 according to any one of Examples 1-4, the object card further comprises a third region for displaying an interactive control, the interactive control comprises an object list control, and the method further comprises:

displaying an associated object list of the target object in response to a trigger operation for the object list control.

According to one or more embodiments of the present disclosure, in the method provided by Example 7 according to any one of Examples 1-4, after switching the first video to the display of the object card of the target object, the method further comprises:

switching the object card to display of the first video or a second video in response to a video playing operation acting on the video playing page, wherein the second video and the first video are different videos.

According to one or more embodiments of the present disclosure, Example 8 provides an information display apparatus, comprising:

a first playing module, configured to play a first video in a video playing page; and an information display module, configured to switch, in response to an information display operation acting on the video playing page, the first video to display of an object card of a target object, wherein the object card comprises a first region and a second region, the first region is used for displaying first information of the target object, and the second region is used for displaying second information of at least one associated object contained in the target object.

According to one or more embodiments of the present disclosure, Example 9 provides an electronic device, comprising:

one or more processors; and a storage apparatus, configured to store one or more programs, wherein the one or more programs, when executed by the one or more processors, cause the one or more processors to implement the information display method according to any one of Examples 1-7.

According to one or more embodiments of the present disclosure, Example 10 provides a computer-readable storage medium, a computer program is stored on the computer-readable storage medium, and the computer program, when executed by a processor, causes the processor to implement the information display method according to any one of Examples 1-7.

According to one or more embodiments of the present disclosure, Example 11 provides a computer program product, and the computer program product, when executed by a computer, causes the computer to implement the information display method according to any one of Examples 1-7.

The scope of the disclosure involved herein is not limited to the embodiments formed by a specific combination of the technical features described above, and shall cover other embodiments formed by any combination of the technical features described above or equivalent features thereof without departing from the concept of the present disclosure. For example, the technical features described above may be mutually replaced with the technical features having similar functions disclosed herein (but not limited thereto) to form new embodiments.

In addition, although the plurality of operations are described in a particular order, this should not be understood as requiring the operations to be executed in the particular order shown or in a sequential order. Under certain circumstances, multitasking and parallel processing may be favorable. Similarly, although the above discussion includes a number of specific implementation details, these should not be interpreted as limiting the scope of the present disclosure. Certain features as described in the context of separate embodiments may also be implemented in a single embodiment in combination. Conversely, various features as described in the context of a single embodiment may also be implemented in a plurality of embodiments individually or in any suitable sub-combination.

Although the present subject matter has been described in a language specific to structural features and/or logical method actions, it should be understood that the subject matter defined in the appended claims is not necessarily limited to the particular features and actions described above. Rather, the particular features and actions described above are merely exemplary forms for implementing the claims.

The invention claimed is:

1. An information display method, comprising:

playing a first video in a video playing page;

displaying, in response to an information display operation acting on the video playing page, an object card of a target object in the video playing page instead of the first video, wherein the object card comprises a first region and a second region, the first region is used for displaying first information of the target object, and the second region is used for displaying second information of at least one associated object contained in the target object; and displaying, in response to a first video playing operation acting on the video playing page, a second video in the video playing page instead of the object card, wherein the second video and the first video are different videos, and the second video is a video adjacent to the target object in a video stream of the video playing page in addition to the first video, wherein the displaying the object card of the target object in the video playing page comprises:

displaying a preset page background associated with the target object in the video playing page, and the object card of the target object is displayed in an upper layer with respect to the preset page background, wherein the preset page background is a page background displayed on a lower layer of the object card in the video playing page when the object card of the target object is displayed.

2. The method according to claim 1, wherein, after displaying the object card of the target object in the video playing page, the method further comprises:

displaying detailed information of the target object in response to a first viewing operation for the target object.

3. The method according to claim 1, wherein, after displaying the object card of the target object in the video playing page, the method further comprises:
displaying detailed information of a first associated object among the at least one associated object in response to a second viewing operation for the first associated object.

4. The method according to claim 1, wherein, after displaying the object card of the target object in the video playing page, the method further comprises:
displaying a first feedback control of the target object in response to a first feedback operation for the target object, wherein the first feedback control is used for triggering feedback on the target object.

5. The method according to claim 1, wherein, after displaying the object card of the target object in the video playing page, the method further comprises:
displaying a second feedback control of a second associated object among the at least one associated object in response to a second feedback operation for the second associated object, wherein the second feedback control is used for triggering feedback on the second associated object.

6. The method according to claim 1, wherein, after displaying the object card of the target object in the video playing page, the method further comprises:
switching the second information of the associated object displayed in the second region in response to an information switching operation acting on the second region.

7. The method according to claim 1, wherein the object card further comprises a third region for displaying an interactive control, the interactive control comprises an object list control, and the method further comprises:
displaying an associated object list of the target object in response to a trigger operation for the object list control.

8. An electronic device, comprising:
one or more processors; and
a storage apparatus, configured to store one or more programs,
wherein the one or more programs, when executed by the one or more processors, cause the one or more processors to implement an information display method, and the method comprises:
playing a first video in a video playing page;
displaying, in response to an information display operation acting on the video playing page, an object card of a target object in the video playing page instead of the first video, wherein the object card comprises a first region and a second region, the first region is used for displaying first information of the target object, and the second region is used for displaying second information of at least one associated object contained in the target object; and
displaying, in response to a first video playing operation acting on the video playing page, a second video in the video playing page instead of the object card, wherein the second video and the first video are different videos, and the second video is a video adjacent to the target object in a video stream of the video playing page in addition to the first video,
wherein the displaying the object card of the target object in the video playing page comprises:
displaying a preset page background associated with the target object in the video playing page, and the object card of the target object is displayed in an upper layer with respect to the preset page background, wherein the preset page background is a page background displayed on a lower layer of the object card in the video playing page when the object card of the target object is displayed.

9. The electronic device according to claim 8, wherein, after displaying the object card of the target object in the video playing page, the method further comprises:
displaying detailed information of the target object in response to a first viewing operation for the target object.

10. The electronic device according to claim 8, wherein, after displaying the object card of the target object in the video playing page, the method further comprises:
displaying detailed information of a first associated object among the at least one associated object in response to a second viewing operation for the first associated object.

11. The electronic device according to claim 8, wherein, after displaying the object card of the target object in the video playing page, the method further comprises:
displaying a first feedback control of the target object in response to a first feedback operation for the target object, wherein the first feedback control is used for triggering feedback on the target object.

12. The electronic device according to claim 8, wherein, after displaying the object card of the target object in the video playing page, the method further comprises:
displaying a second feedback control of a second associated object among the at least one associated object in response to a second feedback operation for the second associated object, wherein the second feedback control is used for triggering feedback on the second associated object.

13. The electronic device according to claim 8, wherein, after displaying the object card of the target object in the video playing page, the method further comprises:
switching the second information of the associated object displayed in the second region in response to an information switching operation acting on the second region.

14. The electronic device according to claim 8, wherein the object card further comprises a third region for displaying an interactive control, the interactive control comprises an object list control, and the method further comprises:
displaying an associated object list of the target object in response to a trigger operation for the object list control.

15. A non-transitory computer-readable storage medium, wherein a computer program is stored on the computer-readable storage medium, and the computer program, when executed by a processor, causes the processor to:
play a first video in a video playing page;
display, in response to an information display operation acting on the video playing page, an object card of a target object in the video playing page instead of the first video, wherein the object card comprises a first region and a second region, the first region is used for displaying first information of the target object, and the second region is used for displaying second information of at least one associated object contained in the target object; and
display, in response to a first video playing operation acting on the video playing page, a second video in the video playing page instead of the object card, wherein the second video and the first video are different videos, and the second video is a video adjacent to the target object in a video stream of the video playing page in addition to the first video, wherein displaying the object card of the target object in the video playing page by the processor comprises:

displaying a preset page background associated with the target object in the video playing page, and the object card of the target object is displayed in an upper layer with respect to the preset page background, wherein the preset page background is a page background displayed on a lower layer of the object card in the video playing page when the object card of the target object is displayed.

16. The non-transitory computer-readable storage medium according to claim 15, wherein the computer program further causes the processor to:

display detailed information of the target object in response to a first viewing operation for the target object.

17. The non-transitory computer-readable storage medium according to claim 15, wherein the computer program further causes the processor to:

display detailed information of a first associated object among the at least one associated object in response to a second viewing operation for the first associated object.

18. The non-transitory computer-readable storage medium according to claim 15, wherein the computer program further causes the processor to:

display a first feedback control of the target object in response to a first feedback operation for the target object, wherein the first feedback control is used for triggering feedback on the target object.

19. The non-transitory computer-readable storage medium according to claim 15, wherein, after displaying the object card of the target object in the video playing page, the computer program further causes the processor to:

display a second feedback control of a second associated object among the at least one associated object in response to a second feedback operation for the second associated object, wherein the second feedback control is used for triggering feedback on the second associated object.

20. The non-transitory computer-readable storage medium according to claim 15, wherein the object card further comprises a third region for displaying an interactive control, the interactive control comprises an object list control, and the computer program further causes the processor to:

display an associated object list of the target object in response to a trigger operation for the object list control.

* * * * *